United States Patent
Kinoshita et al.

(10) Patent No.: US 6,852,159 B2
(45) Date of Patent: Feb. 8, 2005

(54) GYPSUM SLURRY COMPOSITIONS

(75) Inventors: Mitsuo Kinoshita, Gamagori (JP); Masahiro Iida, Gamagori (JP); Shinji Tamaki, Gamagori (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 10/670,446

(22) Filed: Sep. 24, 2003

(65) Prior Publication Data

US 2004/0112257 A1 Jun. 17, 2004

(51) Int. Cl.$^7$ .............................................. C04B 24/24
(52) U.S. Cl. ...................................... 106/778; 106/823
(58) Field of Search ................................. 106/778, 823

(56) References Cited

U.S. PATENT DOCUMENTS 4,703,801 A * 11/1987 Fry et al. ..................... 166/293
4,814,014 A *  3/1989 Arfaei ............................ 524/5
4,960,465 A * 10/1990 Arfaei ......................... 106/724

* cited by examiner

*Primary Examiner*—Paul Marcantoni
(74) *Attorney, Agent, or Firm*—Beyer Weaver & Thomas LLP

(57) ABSTRACT

A gypsum slurry composition contains gypsum, a dispersant and water. A graft copolymer substance of a specified kind, which is one or more of graft copolymers and their salts obtained by specified processes, is contained as the dispersant in an amount of 0.01–1.0 weight %.

16 Claims, No Drawings

GYPSUM SLURRY COMPOSITIONS

This application claims priority on Japanese patent application 2002-364068 filed Dec. 16, 2002.

BACKGROUND OF THE INVENTION

This invention relates to gypsum slurry compositions. Different kinds of molded gypsum objects such as gypsum boards, gypsum plasters and gypsum blocks are produced generally by preparing a gypsum slurry composition containing gypsum, a dispersant and water, pouring it into a mold form and thereafter drying it such that it becomes coagulated and hardened. For such a production process, the gypsum slurry composition is required to have sufficient fluidity and to be capable of exhibiting a superior strength after it has been hardened. This invention relates to gypsum slurry compositions satisfying such requirements.

Examples of gypsum slurry composition of a known kind include those containing not only gypsum and water but also, as a dispersant for gypsum, an anionic surfactant such as lignin sulfonate and naphthalene sulfonate formalin condensation product (such as described in Japanese Patent Publication Tokkai 1-188448), a water-soluble vinyl copolymer obtained by copolymerizing monoester of maleic acid, α, β-unsaturated monocarboxylic acid and (meth)allyl ether having polyoxyalkylene group (such as described in Japanese Patent Publication Tokkai 2002-3257), a water-soluble vinyl copolymer obtained by copolymerizing α, β-unsaturated monocarboxylic acid or its anhydride and alkenyl ether such as allyl ether with polyoxyalkylene group (such as described in Japanese Patent Publication Tokkai 11-314953) or a water-soluble vinyl copolymer obtained by copolymerizing ester of α, β-unsaturated monocarboxylic acid with polyoxyalkylene group, α, β-unsaturated monocarboxylic acid and allyl sulfonic acid (such as described in Japanese Patent Publication Tokkai 8-217505 and U.S. Pat. No. 6,527,850).

These prior art gypsum slurry compositions are not satisfactory because their fluidity is not sufficient, unstable bulky air bubbles are likely to be generated at the time of their production and the molded products obtained therefrom are not sufficiently strong probably due to such air bubbles that are introduced into the hardened molded object.

SUMMARY OF THE INVENTION

It is therefore an object of this invention to provide gypsum slurry compositions with sufficient fluidity that do not generate many air bubbles at the time of the production such that molded objects with improved strength can be obtained.

The invention is based on the discovery by the present inventors as a result of their diligent studies that gypsum slurry compositions containing gypsum, water and a specified kind of graft copolymer substance as a dispersant for gypsum at a specified ratio of 0.01–1.0 weight part per 100 weight parts of gypsum satisfy the aforementioned object.

DETAILED DESCRIPTION OF THE INVENTION

The invention relates to a gypsum slurry composition characterized as containing gypsum, a dispersant therefor in the amount of 0.01–1.0 weight part for 100 weight parts of gypsum and water wherein the dispersant is one or more selected from the group consisting of graft copolymers obtained by the first and second processes described below and their salts obtained further by the third process to be described below:

The first process: The process of obtaining a copolymer of weight-average molecular weight of 5000–70000 by radical copolymerization of radical reactive monomer mixture containing maleic anhydride and monomers shown by Formula (1) given below by 95 molar % or greater at a molar ratio of 50/50–70/30 where Formula (1) is give as:

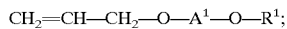

The second process: The process of obtaining a graft copolymer by graft copolymerization of 100 weight parts of the copolymer obtained in the first process with 0.05–5 weight parts of polyether compound shown by Formula (2) given as:

The third process: The process of carrying out partial or complete neutralization of the graft copolymer obtained in the second process by using one or more selected from the group consisting of alkali metal hydroxides, alkaline earth metal hydroxides and amines to obtain a partially or completely neutralized salt of the graft copolymer;

where $R^1$ is acetyl group, methyl group or hydrogen atom; $R^2$ is aliphatic hydrocarbon group with 8–20 carbon atoms; $A^1$ is a residual group obtained by removing all hydroxyl groups from (poly)alkylene glycol having a repetition number of 1–150 for oxyalkylene units composed only of oxyethylene units or of both oxyethylene and oxypropylene units; and $A^2$ is a residual group obtained by removing all hydroxyl groups from polyalkylene glycol having a repetition number of 23–70 for oxyalkylene units composed of both oxyethylene and oxypropylene units that are connected in blocks.

Gypsum slurry compositions of this invention are characterized as comprising gypsum, a dispersant therefor and water and wherein a specified kind of graft copolymer substance is used as the dispersant. Examples of such graft copolymer substance include (1) graft copolymers obtained through aforementioned first and second processes and (2) salts of graft copolymers obtained further through aforementioned third process.

The first process is for obtaining a copolymer by radical copolymerization of radical reactive monomer mixture. A mixture containing maleic anhydride and monomers shown by Formula (1) by more than 95 molar % and at a molar ratio of 50/50–70/30 and more preferably 55/45–65/35 is used as the radical reactive monomer mixture for this purpose.

Regarding Formula (1), $A^1$ may be (1) a residual group obtained by removing all hydroxyl groups from (poly)ethylene glycol with oxyalkylene units consisting only of oxyethylene units or (2) a residual group obtained by removing all hydroxyl groups from (poly)ethylene (poly)propylene glycol with oxyalkylene units including both oxyethylene and oxypropylene units. In the case of (2), the oxyethylene and oxypropylene units may be connected either by random connection, block connection or by both, but the examples of (1) are more preferable. The repetition number of the oxyalkylene units constituting $A^1$ is set to be 1–150 but it is preferably in the range of 10–90.

Regarding Formula (1), $R^1$ may be acetyl group, methyl group or hydrogen atom but acetyl and methyl groups are preferred.

Examples of monomer shown by Formula (1) as explained above include (1) α-allyl-ω-acetyl-(poly)oxyethylene, (2) α-allyl-ω-acetyl-(poly)oxyethylene (poly)

oxypropylene, (3) α-allyl-ω-methoxy-(poly)oxyethylene, (4) α-allyl-ω-methoxy-(poly)oxyethylene (poly) oxypropylene, (5) α-allyl-ω-hyroxy-(poly)oxyethylene, and (6) α-allyl-ω-hyroxy-(poly)oxyethylene (poly) oxypropylene.

The radical reactive monomer mixtures for the first process contain maleic anhydride and monomers shown by Formula (1) by 95 molar % or more. In other words, radical reactive monomers of other kinds may be contained by up to 5 molar %. Examples of such other kinds of radical reactive monomer include styrene, vinyl acetate, acrylic acid, acrylates, alkyl acrylates, (meth)allyl sulfonic acid and (meth)allyl sulfonates.

In the first process, a radical initiator is added to such a radical reactive monomer mixture for a radical polymerization process to obtain copolymers with weight-average molecular weight (hereinafter always weight-average molecular weight Pullulan converted by GPC method) of 5000–70000, or preferably 10000–50000. The radical polymerization may be carried out by (1) the method of not using any solvent for the radical polymerization of radical reactive monomer mixture or (2) the method of dissolving the radical reactive monomer mixture in a solvent such as benzene, toluene, xylene, methyl isobutyl ketone or dioxane for the radical polymerization, but the method of (1) is preferable and it is more preferable to obtain copolymers with weight-average molecular weight of 10000–50000. For carrying out the method of (1), the radical reactive monomer mixture is placed inside a reactor and a radical initiator is added to it under a nitrogen atmosphere to cause a polymerization reaction at 60–90° C. for 5–10 hours and to obtain copolymers. For controlling the radical polymerization reaction either by a method of (1) by using a solvent or by a method of (2) by not using any solvent, the kind and used amount of radical initiator and chain transfer agent, the polymerization temperature and time of polymerization reaction are appropriately selected. Examples of the radical initiator to be used for the purpose of this invention include azo initiators such as azobisisobutyronitrile and 2,2'-azobis (4-methoxy-2,4-dimethylvaleronitrile) and organic peroxide initiators such as benzoyl peroxide, lauroyl peroxide and cumene hydroperoxide.

The second process is for obtaining graft copolymers by a graft reaction of copolymers obtained in the first process with a polyether compound.

Regarding the polyether compounds shown by Formula (2), $R^2$ may be (1) saturated aliphatic hydrocarbon groups with 8–20 carbon atoms such as octyl group, nonyl group, decyl group, undecyl group, dodecyl group, tridecyl group, tetradecyl group, pentadecyl group, hexadecyl group, octadecyl group, isooctadecyl group and dodecyl group and (2) unsaturated aliphatic hydrocarbon groups with 8–20 carbon atoms such as decenyl group, tetradecenyl group, octadecenyl group and eicosenyl group but aliphatic hydrocarbon groups with 10–20 carbon atoms are preferable and unsaturated aliphatic hydrocarbon groups with 12–18 carbon atoms are even more preferable.

Regarding the polyether compounds shown by Formula (2), $A^2$ is a residual group obtained by removing all hydroxyl groups from polyalkylene glycol having a repetition number of 23–70 for oxyalkylene units composed of both oxyethylene and oxypropylene units that are connected in blocks but residual groups obtained by removing all hydroxyl groups from polyalkylene glycol having the repetition number of oxyethylene units equal to 3–10 and that of oxypropylene units equal to 20–60 are preferable. Polyether compounds shown by Formula (2) described above can be synthesized by any known method for the block addition reaction of ethylene oxide and propylene oxide at the rate of 23–70 moles for one mole of aliphatic alcohol with 8–20 carbon atoms.

Graft copolymers are obtained in the second process by a graft reaction of 100 weight parts of copolymers obtained in the first process with 0.05–5 weight parts, or preferably 0.2–4 weight parts, of polyether compounds shown by Formula (2) as explained above. Any known method of graft reaction may be used for this purpose. For example, copolymers obtained in the first process, polyether compounds shown by Formula (2) and a basic catalyst may be placed inside a reactor to carry out a graft reaction at 100° C. for 4–6 hours in a nitrogen atmosphere to obtain graft copolymers. Any basic catalyst commonly used for the ring opening esterification of acid anhydride and alcohol may be used but amine catalysts are preferred and lower alkyl amines are particularly preferred.

Examples of graft copolymer substance to be used as a dispersant for gypsum for the production of gypsum slurry compositions of this invention include not only those that may be obtained by the aforementioned first and second processes but also the salts of such graft copolymers obtained further through the aforementioned third process. The third process is for obtaining salts of graft copolymers by partially or completely neutralizing graft copolymers obtained by the second process by using a basic compound. Examples of basic compound that may be used for the third process include (1) hydroxides of alkali metals such as sodium hydroxide and potassium hydroxide, (2) hydroxides of alkaline earth metal such as calcium hydroxide and magnesium hydroxide, and amines such as ammonia and triethanol amine. One or more of these may be used. These graft copolymers may be used either singly or as a mixture of two or more as a dispersant for gypsum for the production of gypsum slurry compositions of this invention.

Examples of gypsum to be used for the production of gypsum slurry compositions of this invention include by-product gypsum such as gypsum hemihydrate, gypsum dihydrate, anhydrous gypsum, phosphogypsum and fluorogypsum but gypsum hemihydrate is preferred.

As explained above, gypsum slurry compositions of this invention are characterized as comprising gypsum, a graft copolymer substance as a dispersant for gypsum and water but the graft copolymer substance as dispersant is contained at the rate of 0.01–1.0 weight, and preferably 0.05–0.5 weight parts, for 100 weight parts of gypsum. If the content of graft copolymer substance is less than 0.01 weight parts for 100 weight parts of the gypsum, the fluidity of the gypsum slurry compositions is adversely affected. If it becomes greater than 1.0 weight part, on the other hand, the time for coagulation of the gypsum slurry composition becomes too long and the ability to exhibit strength in a short time becomes low.

There is no stringent limitation on the ratios of water and gypsum in the gypsum slurry compositions of this invention but it is preferable to adjust the ratio of water to gypsum in the range of 20–75 weight % and more preferable to make is 30–60 weight %.

In addition to gypsum, graft copolymer substance as dispersant and water, gypsum slurry compositions of this invention may also contain additives of known kinds such as a bulking agent, aggregates, fiber reinforcers and preforms, depending on the purpose of use.

The invention is described next in terms of the following ten embodiments.

Embodiment 1

Gypsum slurry composition with water-to-gypsum ratio of 50 weight % and containing 0.04 weight parts of graft copolymer (P-1) obtained by the following first and second processes for 100 weight parts of gypsum hemihydrate (calcined gypsum):

First process: Process of obtaining copolymers with weight-average molecular weight of 15000 by radical polymerization of radical reactive monomer mixture containing maleic anhydride and α-allyl-ω-acetyl-polyoxyethylene (n=10, where and hereafter n is the repetition number of oxyethylene units) at molar ratio of 60/40 and with total of 100 molar %.

Second Process: Process of obtaining graft copolymer (P-1) by graft reaction of 100 weight parts of copolymers obtained in the first process and 0.3 weight parts of α-oleyl-ω-hydoxy-polyethylene (n=6) polyoxypropylene (m=43, where and hereafter m is the repetition number of oxypropylene units).

Embodiment 2

Gypsum slurry composition with water-to-gypsum ratio of 50 weight % and containing 0.04 weight parts of graft copolymer (P-2) obtained by the following first and second processes for 100 weight parts of gypsum hemihydrate (calcined gypsum):

First process: Process of obtaining copolymers with weight-average molecular weight of 33400 by radical polymerization of radical reactive monomer mixture containing maleic anhydride and α-allyl-ω-acetyl-polyoxyethylene (n=50) at molar ratio of 60/40 and with total of 100 molar %.

Second Process: Process of obtaining graft copolymer (P-2) by graft reaction of 100 weight parts of copolymers obtained in the first process and 0.8 weight parts of α-oleyl-ω-hydoxy-polyoxyethylene (n=6) polyoxypropylene (m=43).

Embodiment 3

Gypsum slurry composition with water-to-gypsum ratio of 50 weight % and containing 0.04 weight parts of graft copolymer (P-3) obtained by the following first and second processes for 100 weight parts of gypsum hemihydrate (calcined gypsum):

First process: Process of obtaining copolymers with weight-average molecular weight of 28000 by radical polymerization of radical reactive monomer mixture containing maleic anhydride and α-allyl-ω-methyl-polyoxyethylene (n=33) at molar ratio of 60/40 and with total of 100 molar %.

Second Process: Process of obtaining graft copolymer (P-3) by graft reaction of 100 weight parts of copolymers obtained in the first process and 3 weight parts of α-oleyl-ω-hydoxy-polyethylene (n=6) polyoxypropylene (m=43).

Embodiment 4

Gypsum slurry composition with water-to-gypsum ratio of 50 weight % and containing 0.04 weight parts of graft copolymer (P-4) obtained by the following first and second processes for 100 weight parts of gypsum hemihydrate (calcined gypsum):

First process: Process of obtaining copolymers with weight-average molecular weight of 42300 by radical polymerization of radical reactive monomer mixture containing maleic anhydride and α-allyl-ω-methyl-polyoxyethylene (n=70) at molar ratio of 60/40 and with total of 100 molar %.

Second Process: Process of obtaining graft copolymer (P-4) by graft reaction of 100 weight parts of copolymers obtained in the first process and 1.5 weight parts of α-lauryl-ω-hydoxy-polyoxyethylene (n=3) polyoxypropylene (m=32).

Embodiment 5

Gypsum slurry composition with water-to-gypsum ratio of 50 weight % and containing 0.04 weight parts of graft copolymer (P-5) obtained by the following first and second processes for 100 weight parts of gypsum hemihydrate (calcined gypsum):

First process: Process of obtaining copolymers with weight-average molecular weight of 47500 by radical polymerization of radical reactive monomer mixture containing maleic anhydride, α-allyl-ω-hydroxy-polyoxyethylene (n=80) polyoxypropylene (m=10) and styrene at molar ratio (maleic anhydride/α-allyl-ω-hydroxy-polyoxyethylene (n=80) polyoxypropylene (m=10)) of 59/41 and with total of 100 molar %.

Second Process: Process of obtaining graft copolymer (P-5) by graft reaction of 100 weight parts of copolymers obtained in the first process and 4 weight parts of α-lauryl-ω-hydoxy-polyethylene (n=3) polyoxypropylene (m=32).

Embodiment 6

Gypsum slurry composition with water-to-gypsum ratio of 50 weight % and containing 0.04 weight parts of partially neutralized salt (P-6) of graft copolymer obtained by the following first, second and third processes for 100 weight parts of gypsum hemihydrate (calcined gypsum):

First process: Process of obtaining copolymers with weight-average molecular weight of 33400 by radical polymerization of radical reactive monomer mixture containing maleic anhydride and α-allyl-ω-acetyl-polyoxyethylene (n=50) at molar ratio of 60/40 and with total of 100 molar %.

Second Process: Process of obtaining graft copolymer (P-4) by graft reaction of 100 weight parts of copolymers obtained in the first process and 0.8 weight parts of α-oleyl-ω-hydoxy-polyoxyethylene (n=6) polyoxypropylene (m=43).

Third process: Process of obtaining partially neutralized salt (P-6) of graft copolymer by a partial neutralization process on the graft copolymer obtained in the second process with sodium hydroxide.

Embodiment 7

Gypsum slurry composition with water-to-gypsum ratio of 35 weight % and containing 0.3 weight parts of aforementioned graft copolymer (P-2) as dispersant for gypsum.

Embodiment 8

Gypsum slurry composition with water-to-gypsum ratio of 35 weight % and containing 0.3 weight parts of aforementioned graft copolymer (P-3) as dispersant for gypsum.

Embodiment 9

Gypsum slurry composition with water-to-gypsum ratio of 35 weight % and containing 0.3 weight parts of aforementioned graft copolymer (P-5) as dispersant for gypsum.

Embodiment 10

Gypsum slurry composition with water-to-gypsum ratio of 35 weight % and containing 0.3 weight parts of completely neutralized salt (P-8) of graft copolymer obtained by the following first, second and third processes for 100 weight parts of gypsum hemihydrate (calcined gypsum):

First process: Process of obtaining copolymers with weight-average molecular weight of 15000 by radical polymerization of radical reactive monomer mixture containing maleic anhydride and α-allyl-ω-acetyl-polyoxyethylene (n=10) at molar ratio of 60/40 and with total of 100 molar %.

Second Process: Process of obtaining graft copolymer (P-4) by graft reaction of 100 weight parts of copolymers obtained in the first process and 0.3 weight parts of α-oleyl-ω-hydoxy-polyoxyethylene (n=6) polyoxypropylene (m=43).

Third process: Process of obtaining partially neutralized salt (P-8) of graft copolymer by a completely neutralization process on the graft copolymer obtained in the second process with sodium hydroxide.

The invention is described next by way of test examples in order to describe the details and effects of this invention but these test examples are not intended to limit the scope of this invention.

Part 1 (Synthesis of Graft Copolymers)
Synthesis of Graft Copolymer (P-1)

Maleic anhydride 157 g (1.6 moles) and α-allyl-ω-acetyl-polyoxyethylene (n=10) 539 g (1.0 mole) were placed inside a reactor and after they were uniformly dissolved with stirring, the atmosphere was replaced with nitrogen. A radical polymerization reaction was initiated by adding azobisisobutylnitrile 3 g while the reaction system was maintained at 70° C. by means of a hot water tank. A total of 5 g of azobisisobutylnitrile was added further in divided parts and the radical polymerization reaction was completed in four hours. The copolymer thus obtained was analyzed and found to have weight-average molecular weight 15000 containing maleic anhydride and α-allyl-ω-acetyl-polyoxyethylene (n=10) at molar ratio of 60/40 (as raw materials). Next, this copolymer 100 g, α-oleyl-ω-hydoxy-polyethylene (n=6) polyoxypropylene (m=43) 0.3 g and tributylamine 2 g as catalyst were placed in the reactor and the atmosphere was replaced with nitrogen. A graft reaction was carried out with stirring for four hours at 90° C. to obtain graft copolymer (P-1).

Synthesis of Graft Copolymers (P-2)–(P-5) and (R-1)–(R-5)

Graft copolymers (P-2)–(P-5) and (R-1)–(R-5) were synthesized similarly to graft copolymer (P-1). Details of these graft copolymers thus synthesized are shown in Table 1 below.

Synthesis of Partially Neutralized Salt (P-6) of Graft Copolymer

A 40% aqueous solution 250 g of aforementioned graft copolymer (P-2) was placed inside a reactor and a 30 weight % aqueous solution of sodium hydroxide 12.7 g was gradually added with stirring to carry out partial neutralization and partially neutralized salt (P-6) of graft copolymer was obtained. Its degree of neutralization was 82%.

Synthesis of Partially Neutralized Salt (P-7) of Graft Copolymer

A 40% aqueous solution 250 g of aforementioned graft copolymer (P-3) was placed inside a reactor and a 30 weight % aqueous solution of sodium hydroxide 13.7 g was gradually added with stirring to carry out partial neutralization and partially neutralized salt (P-7) of graft copolymer was obtained. Its degree of neutralization was 61%.

Synthesis of Completely Neutralized Salt (P-8) of Graft Copolymer

A 40% aqueous solution 250 g of aforementioned graft copolymer (P-1) was placed inside a reactor and a 30 weight % aqueous solution of sodium hydroxide 55.7 g was gradually added with stirring to carry out complete neutralization and completely neutralized salt (P-8) of graft copolymer was obtained.

Synthesis of Completely Neutralized Salt (P-9) of Graft Copolymer

A 40% aqueous solution 250 g of aforementioned graft copolymer (P-4) was placed inside a reactor and a 30 weight % aqueous solution of sodium hydroxide 11.7 g was gradually added with stirring to carry out complete neutralization and completely neutralized salt (P-9) of graft copolymer was obtained. Details of these salts of graft copolymers thus synthesized are also shown in Table 1 below.

TABLE 1

| Type of graft copolymer substance | First process (synthesis of copolymer) | | | | | | | Second process (synthesis of graft copolymer) | | Third process: (synthesis of salt of graft copolymer) Kind of basic compound |
|---|---|---|---|---|---|---|---|---|---|---|
| | Molar % of monomers | | | | | | Weight-average molecular weight | | | |
| | (1) Maleic anhydride | (2) Monomer shown by Formula 1 | | Other monomers | | (1)/(2) | | | | |
| | Molar % | Kind | Molar % | Kind | Molar % | (Molar %) | | *1 | *2 | |
| P-1 | 60 | B-1 | 40 | | | 60/40 | 15000 | D-1 | 0.3 | |
| P-2 | 60 | B-2 | 40 | | | 60/40 | 33400 | D-1 | 0.8 | |
| P-3 | 60 | B-3 | 40 | | | 60/40 | 28000 | D-1 | 3.0 | |
| P-4 | 60 | B-4 | 40 | | | 60/40 | 42300 | D-2 | 1.5 | |
| P-5 | 58 | B-5 | 40 | C-1 | 2 | 59/41 | 47500 | D-2 | 4.0 | |
| P-6 | 60 | B-2 | 40 | | | 60/40 | 33400 | D-1 | 0.8 | NaOH |
| P-7 | 60 | B-3 | 40 | | | 60/40 | 28000 | D-1 | 3.0 | NaOH |
| P-8 | 60 | B-1 | 40 | | | 60/40 | 15000 | D-1 | 0.3 | NaOH |
| P-9 | 60 | B-4 | 40 | | | 60/40 | 42300 | D-2 | 1.5 | NaOH |
| R-1 | 60 | B-1 | 40 | | | 60/40 | 15000 | D-1 | 0.01 | |
| R-2 | 60 | B-1 | 40 | | | 60/40 | 15000 | D-1 | 10 | |
| R-3 | 60 | B-3 | 40 | | | 60/40 | 28000 | DR-1 | 3.0 | |
| R-4 | 50 | B-4 | 40 | C-1 | 10 | 56/44 | 31000 | DR-2 | 3.0 | |
| R-5 | 60 | BR-1 | 40 | | | 60/40 | 82000 | D-2 | 2.5 | |

TABLE 1-continued

| Type of graft copolymer substance | First process (synthesis of copolymer) | | | | | | Second process Weight-average molecular weight | Third process: (synthesis of salt of graft copolymer) | |
|---|---|---|---|---|---|---|---|---|---|
| | Molar % of monomers | | | | | | | (synthesis of graft copolymer) *1 | Kind of basic compound |
| | (1) Maleic anhydride Molar % | (2) Monomer shown by Formula 1 | | Other monomers | | (1)/(2) (Molar %) | | | |
| | | Kind | Molar % | Kind | Molar % | | | | *2 |

In Table 1:
*1: Polyether compound shown by Formula (2)
*2: Weight part of polyether compound shown by Formula (2) used in graft reaction with 100 weight parts of copolymer obtained in the first process
B-1: α-allyl-ω-acetyl-polyoxyethylene (n = 10)
B-2: α-allyl-ω-acetyl-polyoxyethylene (n = 50)
B-3: α-allyl-ω-methyl-polyoxyethylene (n = 33)
B-4: α-allyl-ω-methyl-polyoxyethylene (n = 70)
B-5: α-allyl-ω-hydroxy-polyoxyethylene (n = 80) polyoxypropylene (m = 10)
C-1: Styrene
D-1: α-oleyl-ω-hydroxy-polyoxyethylene (n = 6) polyoxypropylene (m = 43)
D-2: α-lauryl-ω-hydroxy-polyoxyethylene (n = 3) polyoxypropylene (m = 32)
BR-1: α-allyl-ω-acetyl-polyoxyethylene (n = 160)
DR-1: α-lauryl-ω-hydroxy-polyoxyethylene (n = 15)
DR-2: α-oleyl-ω-hydroxy-polyoxyethylene (n = 50)

Part 2 (Preparation of Gypsum Slurry Compositions)

Test Example 1

Gypsum hemihydrate (calcined gypsum for pottery type material A grade produced by Maruishi Gypsum Co., Ltd.) 2500 g, water 1245 g and 30% aqueous solution 3.3 g of graft copolymers synthesized in Part 1 were sequentially placed inside a 5-liter hobart mixer and kneaded together for three minutes to obtain a gypsum slurry composition with the water-to-gypsum ratio of 50 weight %.

Test Examples 2–12, Comparison Examples 2–7 and 9–14

Gypsum slurry compositions of Test Examples 2–12 and Comparison Examples 2–7 and 9–14 were similarly prepared as in Test Example 1.

Comparison Example 1

Gypsum hemihydrate (calcined gypsum for pottery type material A grade produced by Maruishi Gypsum Co., Ltd.) 2500 g and water 1245 g were placed inside a 5-liter hobart mixer and kneaded together for three minutes to obtain a gypsum slurry composition with the water-to-gypsum ratio of 50 weight %.

Comparison Example 8

Gypsum hemihydrate (calcined gypsum for pottery type material A grade produced by Maruishi Gypsum Co., Ltd.) 3000 g and water 1029 g were placed inside a 5-liter hobart mixer and kneaded together for three minutes to obtain a gypsum slurry composition with the water-to-gypsum ratio of 35 weight %.

Part 3 (Evaluation of Gypsum Slurry Compositions)

The gypsum slurry compositions prepared in Part 2 were evaluated regarding flow value, flowrate increase, air content, compressive strength and flexural strength. The results of the evaluation are shown in Table 2.

The flow value (in units of mm) was obtained according to JIS-R5201 by filling a flow cone with each gypsum slurry, measuring the diameter of the spread at two places when the flow cone has been raised and calculating their average as the flow value. The flowrate increase (in unit of %) was calculated as {(the flow value of each Test Example)—(the flow value when graft copolymer is not added)}/(the flow value when graft copolymer is not added)}×100. The air content was measured by the so-called weight method according to JIS-R5213. The compression strength (in units of $N/mm^2$) was measured by producing a sample of 4×4×16 cm with prepared slurry, curing it at temperature of 20° C. and humidity of 80% and measuring the strength of the one-day old sample according to JIS-R5201. The flexural strength (in unit of $N/mm^2$) was measured by producing a sample of 4×4×16 cm with prepared slurry, curing it at temperature of 20° C. and humidity of 80% and measuring the strength of the one-day old sample according to JIS-R5201.

It should be clear from Table 2 that the present invention provides gypsum slurry compositions having sufficient fluidity, generating less air bubbles at the time of production and hence capable of producing molded products with superior strengths.

TABLE 2

| Graft copolymer substance | | Water/ gypsum ratio (%) | Flow value (mm) | Flowrate increase (%) | Air content (%) | Compressive strength ($N/mm^2$) | Flexural strength ($N/mm^2$) |
|---|---|---|---|---|---|---|---|
| Kind | Ratio | | | | | | |

Test Example

TABLE 2-continued

|   | Graft copolymer substance Kind | Graft copolymer substance Ratio | Water/ gypsum ratio (%) | Flow value (mm) | Flowrate increase (%) | Air content (%) | Compressive strength (N/mm$^2$) | Flexural strength (N/mm$^2$) |
|---|---|---|---|---|---|---|---|---|
| 1 | P-1 | 0.04 | 50 | 232 | 81.3 | 0.3 | 11.4 | 3.7 |
| 2 | P-2 | 0.04 | 50 | 237 | 85.2 | 0.1 | 11.9 | 3.9 |
| 3 | P-3 | 0.04 | 50 | 240 | 87.5 | 0.2 | 11.7 | 3.8 |
| 4 | P-4 | 0.04 | 50 | 235 | 83.6 | 0.2 | 11.5 | 3.6 |
| 5 | P-5 | 0.04 | 50 | 230 | 79.7 | 0.4 | 11.3 | 3.7 |
| 6 | P-6 | 0.04 | 50 | 229 | 78.9 | 0.4 | 11.2 | 3.8 |
| 7 | P-7 | 0.04 | 50 | 231 | 80.4 | 0.4 | 11.2 | 3.9 |
| Comp. Example | | | | | | | | |
| 1 | | | 50 | 128 | 0 | 0.5 | 10.4 | 3.3 |
| 2 | R-1 | 0.04 | 50 | 217 | 69.5 | 1.7 | 9.6 | 3.0 |
| 3 | R-2 | 0.04 | 50 | 212 | 65.6 | 3.0 | 9.2 | 2.9 |
| 4 | R-3 | 0.04 | 50 | 185 | 44.5 | 2.6 | 9.5 | 3.1 |
| 5 | R-4 | 0.04 | 50 | 160 | 25.0 | 3.8 | 8.8 | 2.8 |
| 6 | R-5 | 0.04 | 50 | 143 | 11.7 | 1.5 | 9.7 | 3.2 |
| 7 | R-6 | 0.04 | 50 | 150 | 17.2 | 1.0 | 9.9 | 3.3 |
| Test Example | | | | | | | | |
| 8 | P-2 | 0.3 | 35 | 236 | 136 | 0.1 | 20.8 | 4.3 |
| 9 | P-3 | 0.3 | 35 | 243 | 143 | 0.2 | 20.6 | 4.1 |
| 10 | P-5 | 0.3 | 35 | 232 | 132 | 0.3 | 20.5 | 4.1 |
| 11 | P-8 | 0.3 | 35 | 220 | 120 | 0.3 | 20.0 | 4.0 |
| 12 | P-9 | 0.3 | 35 | 237 | 137 | 0.3 | 20.7 | 4.4 |
| Comp. Example | | | | | | | | |
| 8 | | | 35 | 100 | 0 | *3 | *3 | *3 |
| 9 | R-1 | 0.3 | 35 | 170 | 70 | 2.0 | 18.6 | 3.8 |
| 10 | R-2 | 0.3 | 35 | 140 | 40 | 3.1 | 17.5 | 3.7 |
| 11 | R-3 | 0.3 | 35 | 120 | 20 | 3.5 | 16.4 | 3.2 |
| 12 | R-4 | 0.3 | 35 | 100 | 0 | *3 | *3 | *3 |
| 13 | R-5 | 0.3 | 35 | 100 | 0 | *3 | *3 | *3 |
| 14 | R-7 | 0.3 | 35 | 110 | 10 | 3.2 | 17.3 | 3.8 |

In Table 2:
Ratio of graft copolymer substance: Weight part of graft copolymer substance used per 100 weight parts of gypsum hemihydrate
R-6: Dispersant for gypsum of naphthalene sulfonate type (trade name POLEFINE 510-AN produced by Takemoto Yushi Kabushiki Kaisha)
R-7: Dispersant for gypsum of polycarboxylic acid type (trade name CHUPOL HP-11 produced by Takemoto Yushi Kabushiki Kaisha)
*3: There was no fluidity and no measurement was taken

What is claimed is:

1. A gypsum slurry composition comprising gypsum, a dispersant and water, said gypsum slurry composition containing 0.01–1.0 weight parts of a graft copolymer substance as said dispersant for 100 weight parts of said gypsum, said graft copolymer substance comprising one or more selected from the group consisting of graft copolymers obtained by a first process and a second process and salts of graft copolymer obtained further by a third process;

wherein said first process is a process of obtaining copolymers with weight-average molecular weight of 5000–70000 by radical copolymerization of radical reactive monomer mixture containing maleic anhydride and a monomer shown by Formula (1) by 95 molar % or greater and at a molar ratio of 50/50–70/30;

wherein said second process is a process of obtaining graft copolymers by a graft reaction of 100 weight parts of said copolymers obtained by said first process and 0.05–5 weight parts of a polyether compound shown by Formula (2);

wherein said third process is a process of partially or completely neutralized salt of said graft copolymers obtained by said second process with one or two selected from the group consisting of alkali metal hydroxides, alkaline earth metal hydroxides and amines;

wherein Formula (1) is

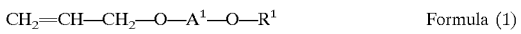   Formula (1)

wherein Formula (2) is

   Formula (2)

wherein $R^1$ is acetyl group, methyl group or hydrogen atom; $R^2$ is aliphatic hydrocarbon group with 8–20 carbon atoms; $A^1$ is a residual group obtained by removing all hydroxyl groups from (poly)alkylene glycol having a repetition number of 1–150 for oxyalkylene units composed only of oxyethylene units or of both oxyethylene and oxypropylene units; and $A^2$ is a residual group obtained by removing all hydroxyl groups from polyalkylene glycol having a repetition number of 23–70 for oxyalkylene units composed of both block-connected oxyethylene and oxypropylene units.

2. The gypsum slurry composition of claim 1 wherein said first process is a process of obtaining copolymers with weight-average molecular weight of 10000–50000 by radical copolymerization of radical reactive monomer mixture in the absence of any solvent.

3. The gypsum slurry composition of claim 1 wherein said second process is a process of obtaining graft copolymers by a graft reaction of 100 weight parts of said copolymers obtained by said first process and 0.2–4 weight parts of a polyether compound shown by Formula (2).

4. The gypsum slurry composition of claim 2 wherein said second process is a process of obtaining graft copolymers by a graft reaction of 100 weight parts of said copolymers obtained by said first process and 0.2–4 weight parts of a polyether compound shown by Formula (2).

5. The gypsum slurry composition of claim 2 wherein $R^1$ in Formula (1) is either acetyl group or methyl group and $A^1$ is a residual group obtained by removing all hydroxyl groups from polyethylene glycol with repetition number of oxyethylene units 10–90.

6. The gypsum slurry composition of claim 3 wherein $R^1$ in Formula (1) is either acetyl group or methyl group and $A^1$ is a residual group obtained by removing all hydroxyl groups from polyethylene glycol with repetition number of oxyethylene units 10–90.

7. The gypsum slurry composition of claim 4 wherein $R^1$ in Formula (1) is either acetyl group or methyl group and $A^1$ is a residual group obtained by removing all hydroxyl groups from polyethylene glycol with repetition number of oxyethylene units 10–90.

8. The gypsum slurry composition of claim 5 wherein $R^2$ in Formula (2) is aliphatic hydrocarbon group with 10–20 carbon atoms and $A^2$ is a residual group obtained by removing all hydroxyl groups from polyalkylene glycol having repetition number of 3–10 for oxyethylene units and repetition number of 20–60 for oxypropylene units.

9. The gypsum slurry composition of claim 6 wherein $R^2$ in Formula (2) is aliphatic hydrocarbon group with 10–20 carbon atoms and $A^2$ is a residual group obtained by removing all hydroxyl groups from polyalkylene glycol having repetition number of 3–10 for oxyethylene units and repetition number of 20–60 for oxypropylene units.

10. The gypsum slurry composition of claim 7 wherein $R^2$ in Formula (2) is aliphatic hydrocarbon group with 10–20 carbon atoms and $A^2$ is a residual group obtained by removing all hydroxyl groups from polyalkylene glycol having repetition number of 3–10 for oxyethylene units and repetition number of 20–60 for oxypropylene units.

11. The gypsum slurry composition of claim 8 with water-to-gypsum ratio of 20–75 weight %.

12. The gypsum slurry composition of claim 9 with water-to-gypsum ratio of 20–75 weight %.

13. The gypsum slurry composition of claim 10 with water-to-gypsum ratio of 20–75 weight %.

14. The gypsum slurry composition of claim 11 wherein said gypsum is gypsum hemihydrate.

15. The gypsum slurry composition of claim 12 wherein said gypsum is gypsum hemihydrate.

16. The gypsum slurry composition of claim 13 wherein said gypsum is gypsum hemihydrate.

* * * * *

UNITED STATES PATENT AND TRADEMARK OFFICE
CERTIFICATE OF CORRECTION

PATENT NO.     : 6,852,159 B2                                                Page 1 of 1
DATED          : February 8, 2005
INVENTOR(S)    : Kinoshita et al.

It is certified that error appears in the above-identified patent and that said Letters Patent is hereby corrected as shown below:

<u>Title page,</u>
Please insert item:

--       [30] Foreign Application Priority Data

December 16, 2002     (JP) ............................... 2002-364068 --.

Signed and Sealed this

Twenty-seventh Day of September, 2005

JON W. DUDAS
*Director of the United States Patent and Trademark Office*